United States Patent [19]

Hiraizumi et al.

[11] Patent Number: 4,469,495
[45] Date of Patent: Sep. 4, 1984

[54] METHOD AND DEVICE FOR DEGASSIFYING LIQUID

[75] Inventors: Kazuo Hiraizumi, Chiba; Kozo Shirato, Saitama; Kazuyasu Kawashima, Kanagawa, all of Japan

[73] Assignee: Erma Optical Works, Ltd., Tokyo, Japan

[21] Appl. No.: 476,467

[22] Filed: Mar. 18, 1983

Related U.S. Application Data

[63] Continuation-in-part of Ser. No. 258,908, Apr. 30, 1981, abandoned.

[30] Foreign Application Priority Data

Jan. 29, 1983 [JP] Japan ............... 58-11683[U]

[51] Int. Cl.³ .............................................. B01D 53/22
[52] U.S. Cl. .................................... 55/189; 55/158; 55/159; 55/195
[58] Field of Search .................. 55/16, 36, 52, 55, 67, 55/158, 159, 189, 195; 210/650, 651, 194, 321.3, 450, 232

[56] References Cited

U.S. PATENT DOCUMENTS

| | | | |
|---|---|---|---|
| 3,303,105 | 2/1967 | Konikoff et al. | 55/16 X |
| 3,367,850 | 2/1968 | Johnson | 55/158 X |
| 3,437,357 | 4/1969 | Rubin | 55/158 X |
| 3,463,615 | 8/1969 | Sochor | 55/36 X |
| 3,469,369 | 9/1969 | Helmke | 55/55 X |
| 3,640,822 | 2/1972 | Hrdina | 55/55 X |
| 3,651,616 | 3/1972 | Blanchard et al. | 55/55 X |
| 3,668,837 | 6/1972 | Gross | 55/158 |
| 3,678,654 | 7/1972 | Low et al. | 55/16 |
| 3,730,351 | 5/1973 | Veronesi | 210/321.3 |
| 3,751,879 | 8/1973 | Allington | 55/189 X |
| 3,856,475 | 12/1974 | Marx | 55/55 X |
| 3,880,759 | 4/1975 | Van Assendelft | 210/194 |
| 3,972,695 | 8/1976 | Buckley et al. | 55/158 |
| 4,056,373 | 11/1977 | Rubin | 55/158 |
| 4,325,715 | 4/1982 | Bowman et al. | 55/158 X |

FOREIGN PATENT DOCUMENTS

| | | | |
|---|---|---|---|
| 2658285 | 10/1977 | Fed. Rep. of Germany | 55/158 |
| 2907188 | 8/1979 | Fed. Rep. of Germany | 55/158 |
| 1213836 | 4/1960 | France | 55/158 |

Primary Examiner—Robert Spitzer
Attorney, Agent, or Firm—Sandler & Greenblum

[57] ABSTRACT

A degassifying apparatus for removing air or other dissolved gas from liquid comprises a degassifying tank placed under at least a partial vacuum. The apparatus also includes a coiled tube having a plurality of turns in a generally spiral configuration which is positioned within the tank. Spacer elements are positioned between adjacent coiled turns of the tube and/or between the tube and an inner wall of the tank to eliminate contact between the tube and the tank and to thereby maximize the total surface area of the tube which is exposed to the decompressed atmosphere within the tank. This provides a highly desirable and advantageous degassifying effect to the liquid being conducted through the tube.

17 Claims, 3 Drawing Figures 4,469,495

METHOD AND DEVICE FOR DEGASSIFYING LIQUID

CO-PENDING APPLICATION

This application is a continuation-in-part application of U.S. Ser. No. 258,908, filed on Apr. 30, 1981 and entitled METHOD AND DEVICE FOR DEGASSIFYING LIQUIDS, now abandoned, the entire disclosure of which is expressly incorporated by reference herein.

BACKGROUND OF THE INVENTION

1. Technical Field of the Invention

The present invention generally relates to a degassifying apparatus for removing air or other gas from a liquid in which it is dissolved.

2. Discussion of the Prior Art

Many liquids are considered to be undesirable when they contain dissolved gasses, e.g., solvents and chemicals used in such liquid chromatography techniques. As one example, in solvents used in the performance of liquid chromatography techniques, more small dissolved gas bubbles appear as the sensitivity of the detector increases. As a result, highly accurate and precise results cannot be obtained unless such dissolved gas is removed from the liquid. Even extremely small amounts of bubbles, i.e., dissolved gasses, cause noises which are proportional to increases in the sensitivity of the detector. Additionally, the greater the amount of gas dissolved in the liquid, the more quickly chemicals, oils, and other materials having such bubbles will deteriorate. In other words, deterioration of drugs and oils accelerates in proportion to the amount of dissolved gasses, e.g., air, which is present in the liquids.

In order to overcome these problems, it has been conventional to remove dissolved gas from liquid by boiling, decompression or vacuum, or by using an ultrasonic technique. These conventional methods, however, are disadvantageous and suffer from defects because as they fail to sufficiently remove dissolved gas from liquid. Additionally, they can only be used with a limited number of liquids; they are accompanied by dangers; and they cannot be incorporated into a continuous system, e.g., a liquid chromatography system, because they allow degassified and/or deaired liquid to reabsorb air, dependent upon the manner of manipulation of the system. All of these negate the desired aeration effected by the system.

More particularly, the boiling method, which deairs or degassifies liquid by heating and boiling, is dangerous and inapplicable when used with a flammable liquid. This method is inconvenient and disadvantageous because as it cannot be applied to liquids, e.g., organic solvents, which change in quality when heated.

The vacuum or decompression method, which de-airs or degassifies liquid by using an aspirator or a decompression device, suffers from the following inconveniences and/or shortcomings: it requires the use of a water system when an aspirator is used; low boiling point liquids may boil in a vacuum; and liquids may reabsorb air after they are no longer subjected to a vacuum.

Finally, the ultrasonic method, which de-airs or degassifies liquids by exposing the liquids to ultrasonic waves, is also inconvenient and defective because it requires an ultrasonic oscillator and because it must be used jointly with the vacuum method, as a result of its insufficient deairing or degassifying effect.

Other inconveniences and/or shortcomings which are associated with conventional methods of degassification include, e.g., that the methods cannot be incorporated into an integrated system such as liquid chromatography, and, as a result, liquids heated at a different location must be brought into the system. Additionally, there is a risk that the results of a desired treatment or process will be meaningless unless the liquids are handled properly, because the liquids may, at a later time, reabsorb air or other gas when such conventional degassifying methods are used.

One alternative degassification method, as proposed in parent application Ser. No. 258,908, incorporates the use of an elongated synthetic resin tube contained in a deairing enclosure tank, which is maintained in a depressurized condition, i.e., under at least a partial vacuum in order to remove gas dissolved in the liquid which passes through the tube. Such a degassification method is advantageous insofar as it eliminates the disadvantages and defects of the conventional methods noted above. However, this method is disadvantageous insofar as the degassification enclosure tank must have an unduly large size; otherwise, the elongated synthetic resin material would not be efficiently accommodated within the tank; on the other hand, if the tube is positioned too close to the walls of the tank, then the total surface area of the tube which is exposed to the depressurized atmosphere within the tank will be insufficient to attain the desired and required degassification of the liquid in the elongated tube. It is, therefore, desirable to maximize the surface area of the tube exposed to the vacuum conditions in order to enhance degassification.

Additionally, because the deairing or degassification method occurs while liquid is being circulated, connecting elements located between the tube, through which liquid to be deaired is passed, and the enclosure tank in which the tube is positioned, as well as between the tube and an external implement, are often exposed to, and readily corroded by, the liquid to be degassified. As a result, exterior air is readily admitted into the tank via the connecting elements, resulting in failure to efficiently reduce pressure in the tank. Accordingly, it is necessary to utilize a device to prevent such shortcomings.

SUMMARY OF THE INVENTION

In consideration of the above, and other inconveniences and shortcomings which are involved in conventional methods of degassification and de-airing, it is one object of the present invention to provide a new and improved device for degassifying a liquid which is simple to use and which is more efficient than previous devices of this type.

By installing and housing a synthetic resin tube within a closed vessel which is under a vacuum, and by transferring a liquid into the synthetic resin tube to remove gasses dissolved in the liquid, the present invention provides a degassification apparatus which is safe and applicable to flammable liquids and/or liquids having low boiling points, which can remove the dissolved gasses almost completely, and which at the same time can be easily incorporated into an integrated system, e.g., a liquid chromatography apparatus.

Accordingly, it is an additional object of the present invention to provide a de-airating apparatus which eliminates the defects of conventional techniques as described above, and in which a long synthetic resin tube can be conveniently and officially positioned within a degassifying and/or deairing enclosure tank to maintain a desired effect on the liquid in a tube.

A further object of the present invention is to provide a new and improved degassification apparatus which includes connecting elements located between an elongated resin tube and the tank, as well as between the tube and an external implement, which are not easily corroded by liquid to be de-aired; yet another object of the present invention is to provide an apparatus which, if such connecting elements should become corroded, will facilitate the exchange and substitution of spare parts for these connecting elements, as well as means for maintaining the connecting elements in air-tight fashion.

According to one aspect of the present invention, a de-airating or degassification apparatus is provided for removing gas dissolved in liquid. The apparatus incorporates a de-airing enclosure tank and an elongated tube formed of synthetic resin material which is adapted to conduct liquid therethrough. The tube is coiled in a generally spiral configuration and is accommodated within the de-airing enclosure tank. A spacer element is interposed between the tube and the tank and/or between adjacent coiled turns of the tube. A pair of external connecting pipes are integrally mounted on the tank. The tube extends at either end outwardly from an end of a corresponding one of a pair of external connecting pipes, and has at its opposite ends an inlet portion and an outlet portion with funnel-like frustoconical configurations. Additionally, a pair of needle connector mouth pieces and a pair of fastening metal members for removably connecting the needle connector mouthpieces to respective external connecting pipes are provided such that the needle connector mouthpieces are placed in fitted engagement with the inlet and outlet tube portions.

The present device is provided for in another aspect by degassifying apparatus for removing dissolved gas from a liquid. This degassifying apparatus incorporates a degassifying enclosure placed under at least a partial vacuum, i.e., under reduced pressure, and an elongated tube positioned within said enclosure and comprising means for conducting liquid through the tank. The tube is coiled into a substantially spiral configuration. At least one spacer element is located adjacent to said coiled tube in order to maximize contact between the tube and the atmosphere within the enclosure.

The enclosure incorporates a tank placed under at least a partial vacuum. The tube is formed from a synthetic resin material, and the at least one spacer element can comprise a plurality of spacers. One of these spacers is located between the top of the tank and the coiled tube; a second spacer element is located between the bottom of the tank and the coiled tube. Additionally, a plurality of relatively small synthetic resin spacer elements are located between adjacent turns of the coiled tube.

Upon further study, the above and other objects, features, and advantages of the present invention will become more fully apparent to those of ordinary skill in the art to which the invention pertains.

BRIEF DESCRIPTION OF THE DRAWINGS

The above and other objects, features, and advantages of the present invention will become more fully apparent to those of ordinary skill in the art to which this invention pertains from the following detailed description, taken with reference to the attached drawings, in which like reference characters designate like or equivalent parts throughout the several views, and wherein.

DETAILED DESCRIPTION OF THE DRAWINGS

Figure 1:
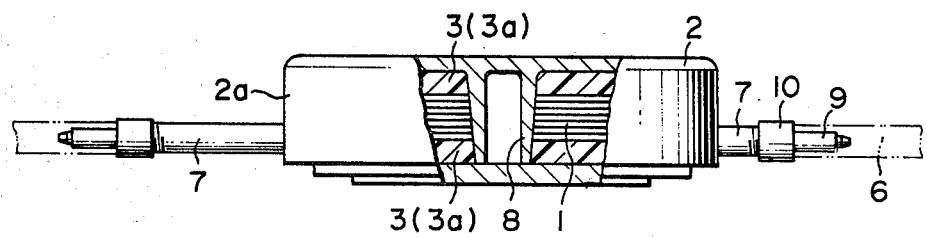
FIG. 1 is a partial cutaway view of a de-airating of degassifying apparatus in accordance with the present invention.
Figure 2:
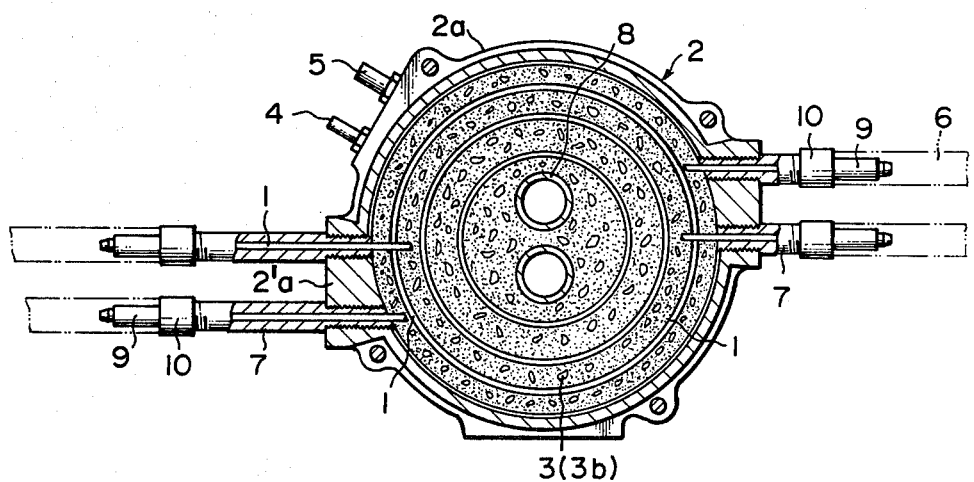
FIG. 2 is a sectional view of the degassifying apparatus of FIG. 1.

Referring more specifically to the figures, a degassification or de-airating apparatus 20 is shown. With specific reference to FIG. 1, the apparatus incorporates a pair of tubes 1 through which liquid to be degassified, e.g., de-aired, is conducted. Each tube 1 comprises a synthetic resin material which is not corroded by liquid to be de-aired, e.g., a tetrafluoroethylene material which has excellent chemical resistance, heat resistance, and strength. Tubes 1 are provided with as small as possible an inner bore or diameter, a minimum thickness of material, and sufficient length to achieve desirable degassification; these dimensions vary, dependent upon the characteristics, flow speed, degree of vacuum or decompression in the tank, and other conditions of the liquid to be degassified (the terms "deaired" and "degassified" are used interchangeably herein). As one example, a tube having a length of between 10 and 45 meters is sufficient to perform substantially complete de-airation or degassification when it has an inner bore of between 0.2 and 12 mm in diameter, and a material thickness of between 0.2 and 1.0 mm, which under conditions in which liquid to be de-aired or degassified is conducted through the tube at a speed of between 0.1 to 10.0 ml/min. and under a pressure which is reduced to approximately 700 mm Hg. Tubes 1, as illustrated in FIGS. 1 and 2, are coiled in a generally spiral form and are positioned within degassification enclosure tank 2. In order to maximize the total surface area of tubes 1 which are exposed to the vacuum or decompressed atmosphere within tank 2, i.e., in order to minimize the total contact area between adjacent coiled turns of tubes 1, as well as to minimize the total contact area between tubes 1 and tank 2, at least one spacer element 3, best illustrated in FIGS. 1 and 2, is interposed between tubes 1 and an inner wall of tank 2, and/or between adjacent coil turns of tubes 1. Spacer element 3 is preferably formed, e.g., of a foamed resin material or other material having continuous air holes therein. The spacers can be formed so as to have the configuration of either a planar plate, e.g., elements 3a, or smaller elements, e.g., foamed pieces or particles 3b.

In the embodiment shown in the drawings, spacer element 3 comprises a pair of planar plates 3a disposed adjacent to upper and lower inner tank walls 11 and 12, respectively, and along the inner circumferential wall portions of tank 2. A plurality of small spacer members or pieces 3b are disposed between tubes 1, as best shown in FIG. 2. Because spacer element 3 is provided in order to minimize the contact zone or area between adjacent coil turns of tubes 1, as well as the contact area between tubes 1 and tank 2, (to thereby increase the contact zone or area of the tubes with the atmosphere within the tank) the material of the spacer and its configuration, as well as its method of installation, need not be limited to the embodiment shown.

Degassifying enclosure tank 2 is formed of a suitable metal which is sufficiently strong and which is generally formed into the general configuration of a disc having a flanged circumferential wall 2a. Circumferential wall 2a of tank 2 includes a first connecting plug 4 which is provided for connecting the tank to an external decompression device which will place the interior of the tank under at least a partial vacuum. A second connecting plug 5 is provided for connecting the enclosure with an external pressure sensor, and two pairs of external connecting pipes 7 are provided for permitting opposite ends of tubes 1 to extend externally of tank 2 (FIG. 2). The connector elements can be attached to, or formed integrally with, tank 2, and permit fluidic communication between the exterior and the inside of tank 2. A support post 8 is provided to support the top and bottom walls of tank 2 relative to one another.

External connecting pipes 7 are comprised of brass and have a hollow pipe-like configuration. Pipes 7 are closely positioned, e.g., by screwing, into boss portions 2a' along tube circumferential wall 2a of tank 2. In other words, tube inlet portions 1a and outlet portions 1b, through which liquid to be degassified is admitted into the tubes, are positioned so that the pipes constitute extensions or guides within which the tube portions are located, and exits are so positioned.

Figure 3:
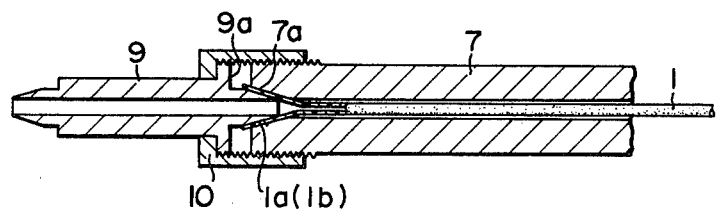
FIG. 3 is an enlarged cross-sectional view of a connecting element forming part of the degassification apparatus of FIG. 1.

Each of the respective inlet and outlet portions 1a and 1b, which are located at opposite ends of tubes 1, are recessed into a funnel or frustoconical configuration and are fitted within a complementary-shaped opening 7a (see FIG. 3), which is formed at the end of an external connecting pipe 7. Needle connector mouthpiece 9, having a flange 9a adjacent one of its ends, is then fittedly engaged with the inlet and outlet portions 1a and 1b, respectively, which are located at the opposite ends of tubes 1. Each mouthpiece removably connected to a respective external connection pipe 7 by a metal fastening member, e.g., screw member 10. More particularly, metal fastening member 10, which is engaged with flange 9a of needle connector mouthpiece 9, is screwed onto the free end of the external connecting pipe 7. In this fashion, the needle connector mouthpiece 9 is removably connected to the external connecting pipe 7, and the end of the needle connector mouthpiece 9 is pressed against the inlet or outlet portion 1a or 1b located at the end of tube 1. Mouthpiece 9 is preferably made of stainless steel because it will be exposed to liquid to be degassified, and in this way it minimizes the occurrence of corrosion. Thus, in term, minimizes the possibility of undesirable gasses entering the tank via the connection, which would adversely affect the low pressure tank environment. A connecting pipe 6, attached to an external implement (not shown) is best illustrated in FIG. 2; pipes 6 can be attached to respective needle connectors 9, and in turn are attached to necessary devices.

As is apparent from the above description, a de-airating or degassifying apparatus is provided which includes a tube formed of a synthetic material which is adapted to conduct liquid therethrough. This tube is coiled into a generally spiral form and is positioned within a deairing and degassifying enclosure tank which comprises, in accordance with the present invention, at least one spacer element interposed between the tube and the tank and/or between adjacent coiled turns of the tube. Accordingly, even if a tube of a undue length is positioned closely to the interior walls of the tank, the spacer element will prevent contact of adjacent coiled turns of the tube with each other, and of the tube with an inner wall of the tank. This results in a desirable increase in the total surface area of the tube which is exposed to the decompressed atmosphere, i.e., vacuum, within the tank, to thus obtain a desirable degassifying or de-airing effect. Simultaneously, the elongated tube can be simply and efficiently located or disposed within a tank of a relatively small size to reduce the size and weight of the overall apparatus.

Furthermore, in accordance with the present invention, the tube extends at both of its end outwardly from the tank via a respective external connector pipe integrally mounted on the tank. Opposite ends of the tube have an inlet portion and an outlet portion, each comprising a funnel-like configuration. A needle connector mouthpiece is removably fastened to the external connecting pipe by a metallic fastening member. In this fashion, the needle connector mouthpiece is placed into fitting engagement with the inlet and outlet portions of the tube, respectively. Accordingly, liquid is exposed only to the needle connector mouthpiece and an inner surface of the tube, so that even where highly corrosive liquid is being de-aired or degassified, corrosion of the tank and the external connecting pipe by the liquid to be degassified will be minimized. Even if the needle connecting mouthpiece is corroded by liquid which is degassified, the arrangement can be simply and inexpensively repaired simply by exchanging or substituting only a new connector mouthpiece for a corroded mouthpiece. This results in a desirable improvement in durability and reliability of the apparatus.

Additionally, because of the arrangement of the present invention as is set forth above, there is little, if any, chance that exterior air will be admitted into the tank from a connecting portion of the tube to the tank or from a connection with an external implement. Consequently, the pressure within the tank can be reduced efficiently and connection with external implements can be carried out with ease; accordingly, the entire apparatus can be provided in the form of a cartridge. Further, the arrangement eliminates the necessity of welding connections and can, therefore, be easily assembled and produced at a reduced cost. At the same time, simple exchange and substitution of parts is facilitated.

From the aforegoing description, one skilled in the art can easily ascertain the essential characteristics of this invention, and without departing from the spirit and scope thereof, can make various changes and modifications of the invention to adapt it to various usages and conditions.

What is claimed is:

1. Degassifying apparatus for removing dissolved gas from a liquid, said apparatus comprising:
   (a) a degassifying enclosure placed under at least a partial vacuum;
   (b) an elongated tube positioned within said enclosure and comprising means for conducting liquid therethrough, said tube being coiled in a substantially spiral configuration; and
   (c) a plurality of spacer elements located adjacent to said coil tube in order to maximize contact between said tube and the atmosphere within said enclosure, said plurality of spacer elements including two planar plates, one of said planar plates being positioned between said coiled tube and a bottom wall of said enclosure, the other of said planar plates being positioned between said coiled tube and a top wall of said enclosure.

2. Degassifying apparatus in accordance with claim 1, wherein said enclosure comprises a tank.

3. Degassifying apparatus in accordance with claim 2, wherein said spacer element is positioned between said tube and said tank.

4. Degassifying apparatus in accordance with claim 3, wherein said tube is coiled into a plurality of turns and wherein a plurality of said spacer elements are positioned between said coiled turns.

5. Degassifying apparatus in accordance with claim 4, wherein said elongated tube is comprised of a synthetic resin material.

6. Degassifying apparatus in accordance with claim 4, further comprising at least one pair of exterior connecting pipes mounted onto said tank.

7. Degassifying apparatus in accordance with claim 6, comprising two pairs of said exterior connecting pipes mounted onto said tank.

8. Degassifying apparatus in accordance with claim 6, wherein said tube includes two opposite ends, each of said opposite ends being connected to one of said exterior connecting pipes.

9. Degassifying apparatus in accordance with claim 8, wherein the ends of said tube terminate in frustoconical inlet and outlet portions.

10. Degassifying apparatus in accordance with claim 9, further comprising a needle connector attached to each of said exterior pipes by a metal fastening element, whereby said needle connector is placed into fitted engagement with said inlet and outlet tube portions.

11. Degassifying apparatus in accordance with claim 10, wherein each fastening element has threads and is adapted to be screwed onto one end of an exterior connecting pipe.

12. Degassifying apparatus in accordance with claim 11, wherein each of said needle connectors includes a flange which engages a respective one of said metal fasteners.

13. Degassifying apparatus in accordance with claim 2, wherein said tank incorporates a boss portion to which at least one exterior connection pipe is adapted to be connected.

14. Degassifying apparatus in accordance with claim 2, further comprising a second coiled tube disposed within said enclosure, a spacer element being interposed between said two tubes.

15. Degassifying apparatus in accordance with claim 1, wherein said spacer element comprises foamed resin material.

16. Degassifying apparatus in accordance with claim 15, wherein said spacer element comprises a plurality of small foamed resin pieces positioned between adjacent coiled turns of said tube.

17. A degassifying apparatus for removing dissolved gas from a liquid, said apparatus comprising:
(a) a degassifying enclosure placed under at least a partial vacuum, said enclosure comprising a tank with at least one pair of connecting pipes mounted onto the exterior of said tank;
(b) an elongated tube positioned within said tank and comprising means for conducting liquid therethrough, said tube being coiled into a plurality of turns in a substantially spiral configuration and having two opposite ends, each of said ends being connected to a respective one of said connecting pipes, said tube ends terminating in frustoconical inlet and outlet portions, respectively, a needle connector being attached to each of said pipes by a metal fastening element, said needle connector being placed into fitted engagement with said inlet and outlet tube portions; and
(c) a plurality of spacer elements located adjacent to said coiled tube in order to maximize contact between said tube and the atmosphere within said enclosure, at least one spacer element being positioned between said tube and said tank, and other of said spacer elements being positioned between said coiled turns of said tube.

* * * * *